Aug. 20, 1935.  W. T. CHRISTMAN  2,011,752
COOKING UTENSIL
Filed Nov. 14, 1933
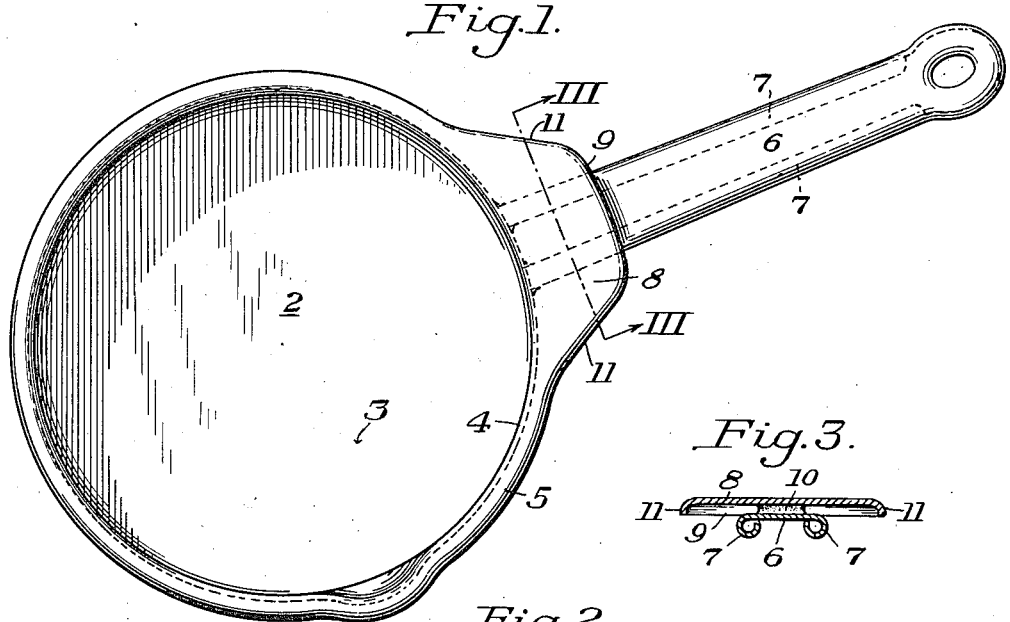
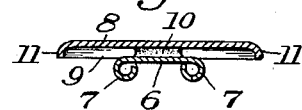
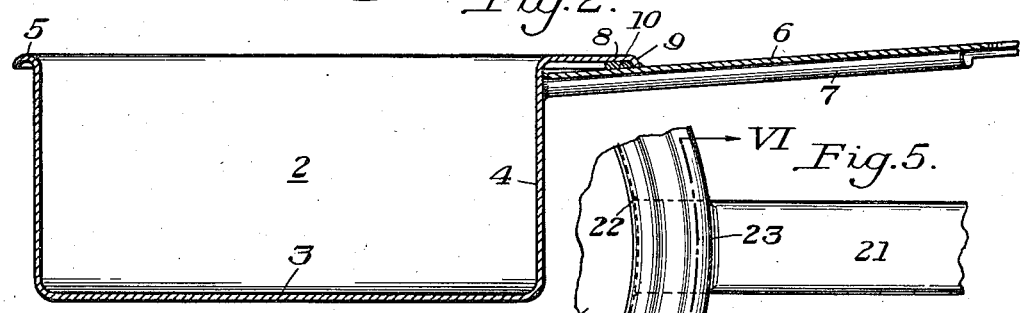
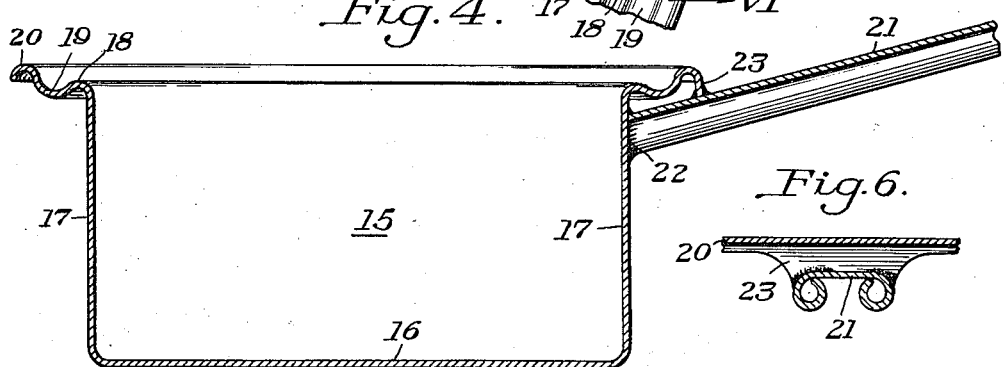
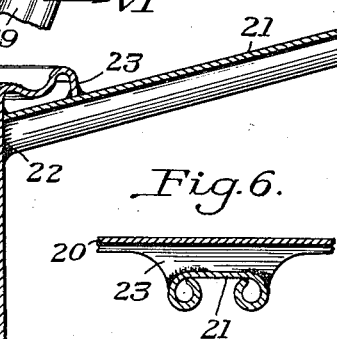
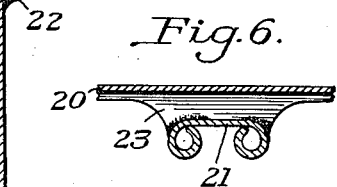
INVENTOR
William T. Christman
by his atty's
Byrnes, Stebbins, Parmelee & Blenko Patented Aug. 20, 1935

2,011,752

UNITED STATES PATENT OFFICE 2,011,752

COOKING UTENSIL

William T. Christman, Mount Lebanon, Pa., assignor to Federal Enameling & Stamping Company Application November 14, 1933, Serial No. 697,936

7 Claims. (Cl. 53—8)

Heretofore it has been the common practice to provide handles on pans, these handles being secured to the side wall of the pan by means of rivets which pass through the pan. In cheaper pans, attempts have been made to weld the handle directly to the outside of the pan. Where the practice of riveting the pans has been followed, it is necessary to punch holes through the side wall of the pan. Not infrequently do the rivets become loose, allowing the handle to wobble and permitting the contents of the pan to escape around the rivets. Where the handle has been secured to the outside of the pan entirely by welding, the handle is very likely to bend at the point where it is attached to the body of the pan.

According to the present invention, there is provided a rigid type of handle construction which eliminates rivets and the necessity for punching holes in the sides of the pan, and which is reinforced against bending by an extension at the top of the pan.

The invention may be readily understood by reference to the accompanying drawing, in which Figure 1 represents a plan view of a pan embodying my invention;

Figure 2 is a transverse vertical section through the pan;

Figure 3 is a cross section through the handle and extension in substantially the plane of line III—III of Figure 1;

Figure 4 is a view similar to Figure 2 of a slightly modified form of pan;

Figure 5 is a partial top plan view of the modified form shown in Figure 4; and

Figure 6 is a transverse section similar to Figure 3, of this modified arrangement, the section being in the plane of line VI—VI of Figure 5.

In the drawing, 2 designates the body of a more or less conventional form of pan, this pan having a bottom 3 and a side wall 4. The top edge or rim of the pan is designated 5. The handle 6 is formed of sheet metal and comprises a substantially flat piece of metal having the longitudinal edges rolled inwardly as indicated at 7 in Figure 3 to form longitudinally extending reinforcing ribs along the under side of the handle throughout substantially the entire length of the handle. The inner end of the handle 6 abuts against the side wall 4 of the pan and is welded directly to the pan. In the arrangement shown in Figures 1 to 3, inclusive, the rim of the pan is provided with an extension or projecting lip portion 8 which overhangs and extends back over the handle 6 an appreciable distance. At its outer extremity, it has a downwardly turned edge portion 9 that contacts with the flat top of the handle 6, and the handle and this projection are welded together. In Figure 2, I have indicated a small mass of metal 10 as forming the weld. Not only is the lip or projection 8 turned down at the outer edge 9, but its side edges 11 are also turned down and merge into the rim portion 5 of the pan. The turned-down side edges 11 impart considerable rigidity to the projection or lip 8.

By reason of the fact that the handle is welded to the side wall of the pan and to the projection 10 at a point spaced well outwardly from the side wall of the pan, an extremely rigid connection is provided between the handle and pan, and the rigidity of this connection is increased by reason of the fact that the lip or projection 8 is stiffened by the downwardly turned side edges 11. The downwardly turned outer edge 9 of this lip abutting against the handle conceals the weld and gives a neat and finished appearance to the assembly and avoids the formation of any crevice in which foreign material may lodge.

In Figures 1 to 3, inclusive, the handle is shown as being applied to a conventional type of sauce pan. In Figures 4, 5 and 6, I have shown a modification of the invention in which the handle is attached to a stewing pan of the type having a grooved lip or flange at its top for cooperation with a cover, not shown. Certain types of pans are provided with a relatively wide flange or rim at the top thereof, this flange or rim having a groove into which the edge of a cover fits. Vapors from the material being cooked condense on the lid, flow into this trough and form, in effect, a seal between the cover and lid. It is to such a type of pan that Figures 4, 5, and 6 relate.

In Figures 4, 5 and 6, the numeral 15 designates the body of a pan having a bottom 16, a side wall portion 17 and an outwardly turned flange 18 in which is a circumferential groove or trough 19. Outside of the groove or trough 19 and above the top of the trough is a downwardly turned rim or lip 20. The over-all width of the flange portion 18 including the trough and the rim, is quite appreciable and the rim is quite rigid and stiff. The handle 21 is of the construction previously described in Figure 1. Its inner end is welded to the outer wall of the pan below the flange 18, the point of weld being designated 22. At the point where the rim 20 overhangs the handle, the rim is extended down very slightly, forming a lip 23 which contacts with the top of the handle, the handle and this lip being welded together. With this construction also, there is a handle which is welded to the side wall of the pan and which is attached to a lateral extension of the pan some distance out from the side wall, the arrangement providing an extremely rigid and practical assembly and one which is of good appearance.

The handle itself, of course, is stiff and rigid by reason of the curled-in edge portions forming the beads or ribs 7. These edge portions not only reinforce the handle, but also eliminate any sharp edge along that portion of the handle which is grasped with the hand.

The advantages of the invention reside in the provision of a rigid handle having no sharp edges, rigidly secured to the pan in such manner as to minimize the bending strain on the handle, and without requiring the use of rivets.

While I have shown the invention as being applied to specific forms of pans, it will be understood that this is merely by way of illustration and various changes and modifications may be made in the specific construction within the contemplation of my invention.

I claim:

1. A pan having a body with a bottom and a side wall, a handle formed of sheet metal having an end thereof welded to the side wall of the pan, and a portion at the top of the pan overhanging the handle and welded to the top of the handle at a point spaced outwardly from the side wall of the pan, the portion of the handle intermediate the end which is welded to the pan and the said point of weld being out of contact with any portion of the pan.

2. A pan having a body with a bottom and a side wall with a downwardly curled lip portion therearound, a handle having an end portion which abuts against the side wall of the pan and is welded thereto, and a portion at the top of the pan overhanging the handle and welded to the handle at a point spaced outwardly from the side wall of the pan, the space between the welds being greater than the width of the lip portion.

3. A pan having a body with a bottom and a side wall, a handle having an end portion which abuts against the side wall of the pan and is welded thereto, and a portion at the top of the pan overhanging the handle and welded to the handle at a point spaced outwardly from the side wall of the pan, said portion of the pan which overhangs the handle having a downwardly bent lip which is joined to the top of the handle, the distance between the point where the handle contacts the side and is welded to the overhang being greater than the width of the lip.

4. A pan having a body with a bottom and a side wall, a handle having an end portion which abuts against the side wall of the pan and is welded thereto, and a portion at the top of the pan overhanging the handle and welded to the handle at a point spaced outwardly from the side wall of the pan, said portion of the pan which overhangs the handle having an annular trough portion around the outside of which is an annular downwardly bent lip which is joined to the top of the handle, the top of the handle being substantially flat.

5. A pan having a body with a bottom and a side wall, a handle having an end portion which abuts against the side wall of the pan and is welded thereto, and a portion at the top of the pan overhanging the handle and welded to the handle at a point spaced outwardly from the side wall of the pan, said portion of the pan which overhangs the handle having a downwardly bent lip which contacts with the top of the handle, the handle comprising a substantially flat elongated sheet metal body having the longitudinal edges thereof turned under to form beads which extend from the point of attachment of the handle to the pan throughout the greater portion of the length of the handle.

6. A pan having a body with a bottom and a side wall, a handle having an end thereof abutting against the side wall of the pan and secured thereto, and an integral, lateral ear-like extension at the top of the pan extending beyond the outermost portion of the top of the pan overhanging the handle and being welded to the handle at a point spaced well outwardly from the side wall of the pan, said integral extension having means thereon to stiffen it against bending.

7. A pan comprising a body having a bottom and side walls and having a handle, one end of the handle being secured to the side wall of the body, a rigid means in the nature of a projecting ear extending beyond the diameter of the top of the pan and projecting laterally over the handle, the ear being secured to the handle intermediate the point where the handle is joined to the side wall of the pan and the outer end of the handle, said ear being provided with downwardly turned edges to increase the rigidity thereof.

WILLIAM T. CHRISTMAN.